US005882063A

United States Patent [19]

Job

[11] Patent Number: 5,882,063

[45] Date of Patent: Mar. 16, 1999

[54] TRACTOR CANOPY ATTACHMENT SYSTEM

[75] Inventor: Richard W. Job, Liberty, Mo.

[73] Assignee: AGCO Corporation, Independence, Mo.

[21] Appl. No.: 850,418

[22] Filed: May 2, 1997

[51] Int. Cl.$^{6}$ .................... B62D 25/06

[52] U.S. Cl. .................... 296/102; 296/190.03; 296/103

[58] Field of Search .................... 296/102, 190.03, 296/77.1, 79, 103; 280/756; 135/88.01, 88.02, 88.03, 88.05

[56] References Cited

U.S. PATENT DOCUMENTS

| | | | |
|---|---|---|---|
| 869,061 | 10/1907 | Cox | 135/88.02 |
| 1,251,904 | 1/1918 | Mamaux | 135/138 |
| 1,465,712 | 8/1923 | Hanson . | |
| 2,785,002 | 3/1957 | Schumaker . | |
| 2,921,799 | 1/1960 | Hatten . | |
| 3,455,598 | 7/1969 | Tweedy et al. . | |
| 3,712,664 | 1/1973 | May . | |
| 3,964,782 | 6/1976 | Pernicka et al. . | |
| 4,032,187 | 6/1977 | Atherton . | |
| 4,049,294 | 9/1977 | Atherton . | |
| 4,102,537 | 7/1978 | Takahashi et al. . | |
| 4,158,460 | 6/1979 | White . | |
| 4,159,835 | 7/1979 | Leja et al. . | |
| 4,376,550 | 3/1983 | Strauss . | |
| 4,382,613 | 5/1983 | Haupt . | |
| 4,469,114 | 9/1984 | Kelly et al. | 135/125 |
| 4,666,183 | 5/1987 | Azzarello . | |
| 4,949,991 | 8/1990 | Ludwig . | |
| 5,022,420 | 6/1991 | Brim | 135/161 |
| 5,042,835 | 8/1991 | Burns . | |
| 5,168,889 | 12/1992 | Diestel | 135/88.01 |
| 5,503,430 | 4/1996 | Miki et al. . | |

*Primary Examiner*—Dennis H. Pedder
*Assistant Examiner*—Kiran Patel
*Attorney, Agent, or Firm*—Litman, McMahon & Brown, L.L.C.

[57] ABSTRACT

A tractor canopy attachment system includes a pair of vertical mounting brackets which are attachable on respective upright posts of a tractor roll bar and a horizontal mounting bracket which is attachable to a cross member of the roll bar. A canopy attachment frame includes a cross member attached to the canopy near the rear thereof, with a mounting flange attached to the cross member which cooperates with the horizontal mounting bracket to hold the canopy in place on the roll bar. A pair of angled braces are attached to respective ends of the cross member, with each brace being removably attachable to a respective one of the vertical mounting brackets. A plurality of easily removable pins hold the canopy mounting flange in position on the horizontal bracket and a single pin holds each angled brace in position on its respective vertical mounting bracket. With the inventive installation system, the entire canopy structure is easily installed or removed in a few minutes by a lone operator.

22 Claims, 2 Drawing Sheets

TRACTOR CANOPY ATTACHMENT SYSTEM

FIELD OF THE INVENTION

The present invention relates to a tractor canopy attachment system for an agricultural tractor equipped with a roll bar. More particularly, the inventive canopy attachment system is designed for convenient and quick installation on and removal from the tractor roll bar, yet holds the canopy securely in position once installed.

BACKGROUND OF THE INVENTION

In the United States alone more than 60 deaths per year occur from agricultural tractor rollovers. In order to minimize deaths and injuries from such rollovers, modern agricultural tractors are often equipped with roll bars which surround the operator's position and protect the operator in the event of a rollover. However, these roll bars necessarily have a high profile, thus making it impossible to use the tractor in a confined space, such as a low ceilinged barn or storage shed. The roll bars are also bulky and heavy, and are thus difficult to remove and replace. A solution has been to break the upright supports of the roll bar and attach a locking hinge such that the upper roll bar portion can be hinged backward to minimize overall tractor height, but can also be locked in place for outdoor use.

It has also become a common practice to attach a canopy, typically made of fiberglass, to the roll bar to protect the operator from the elements, including both sun and rain. Such canopies have typically been rather heavy and awkward and are usually attached via a number of bolts and nuts extending through the roll bar. These canopies are difficult to install and remove, a task often taking upwards of an hour for a lone operator. Thus, the advantages of a hinged roll bar are largely lost when a canopy is installed on the roll bar.

It is clear then, that a need exists for an improved canopy attachment system for tractor roll bars, including hinged roll bars, which system allows a lone operator to quickly and easily attach and remove the canopy.

SUMMARY OF THE INVENTION

The present invention is directed to a tractor canopy attachment system which includes a pair of vertical mounting brackets which are attachable to respective upright posts of a tractor roll bar and a horizontal mounting bracket which is attachable to a horizontal bar on the roll bar. The horizontal mounting bracket includes a mounting flange extending upward therefrom. An attachment frame connected to the canopy includes a cross member attached to a bottom side of the canopy near the rear thereof. A mounting flange receiver is attached to an upper side of the cross member near the center thereof, which receiver cooperates with the mounting flange on the horizontal mounting bracket to hold the canopy in place on the roll bar. A pair of angled braces are attached near respective ends of the frame cross member, with each brace including a vertical support arm attached to and extending downward from the cross member to a position in which it is removably attachable to a respective one of the vertical mounting brackets. Each brace also includes an angled support arm which is attached to and extends forward and upward at an angle from the vertical support arm, with a terminal end of the angled support arm being attached to the bottom side of the canopy forward of the point of attachment of the cross member. A plurality of easily removable pins hold the mounting flange receiver in position on the mounting flange and a single pin holds each angled brace in position on its respective vertical mounting bracket. With the inventive installation system, the entire canopy structure is easily attached to or removed from the roll bar in a few minutes by a lone operator.

OBJECTS AND ADVANTAGES OF THE INVENTION

The principal objects of the present invention are: to provide an improved canopy attachment system for an agricultural tractor; to provide such a system in which a number of support brackets are removably attached to a tractor roll bar; to provide such a system in which a canopy attachment frame is attached to the bottom side of the canopy; to provide such a system in which the attachment frame is removably held in place on the roll bar by the support brackets; to provide such a system in which the canopy is latched in place on the roll bar by easily removable pins; to provide such a system which allows a lone operator to install or remove a canopy within a few minutes; to provide such a system which is ideal for installation on hinged tractor roll bars; and to provide such a system which is particularly well adapted for its intended purpose.

Other objects and advantages of this invention will become apparent from the following description, taken in conjunction with the accompanying drawings wherein are set forth, by way of illustration and example, certain embodiments of this invention.

The drawings constitute a part of this specification and include exemplary embodiments of the present invention and illustrate various objects and features thereof.

DETAILED DESCRIPTION OF THE INVENTION

As required, detailed embodiments of the present invention are disclosed herein, however, it is to be understood that the disclosed embodiments are merely exemplary of the invention, which may be embodied in various forms. Therefore, specific structural and functional details disclosed herein are not to be interpreted as limiting, but merely as a basis for the claims and as a representative basis for teaching one skilled in the art to variously employ the present invention in virtually any appropriately detailed structure.

Figure 1:
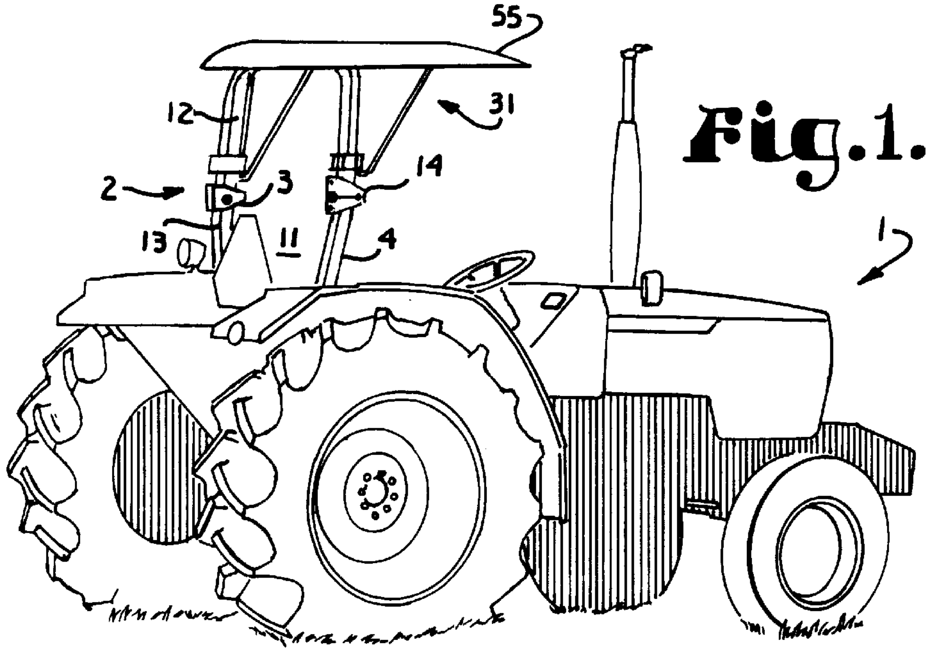
FIG. 1 is a perspective view of an agricultural tractor equipped with a hinged roll bar with a canopy attached via the inventive canopy attachment system.
Figure 2:
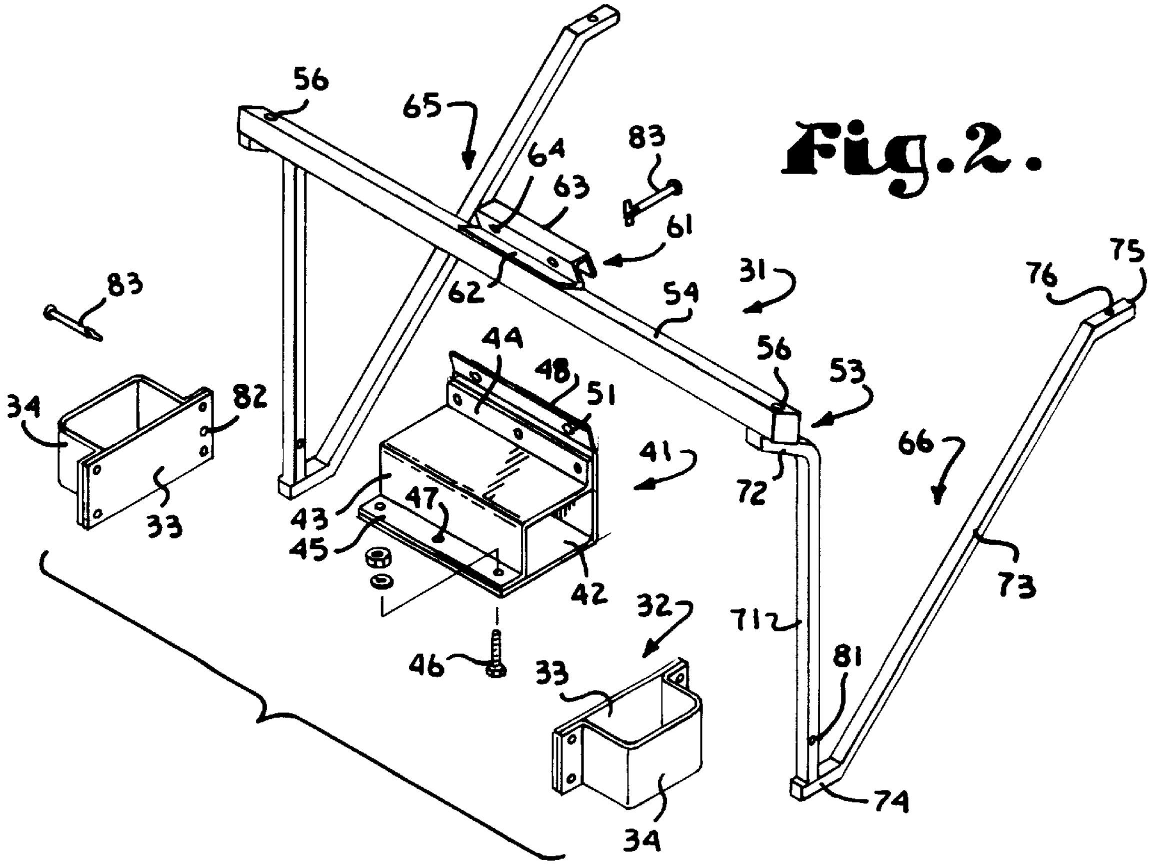
FIG. 2 is a greatly enlarged, exploded view of the inventive canopy attachment system.
Figure 3:
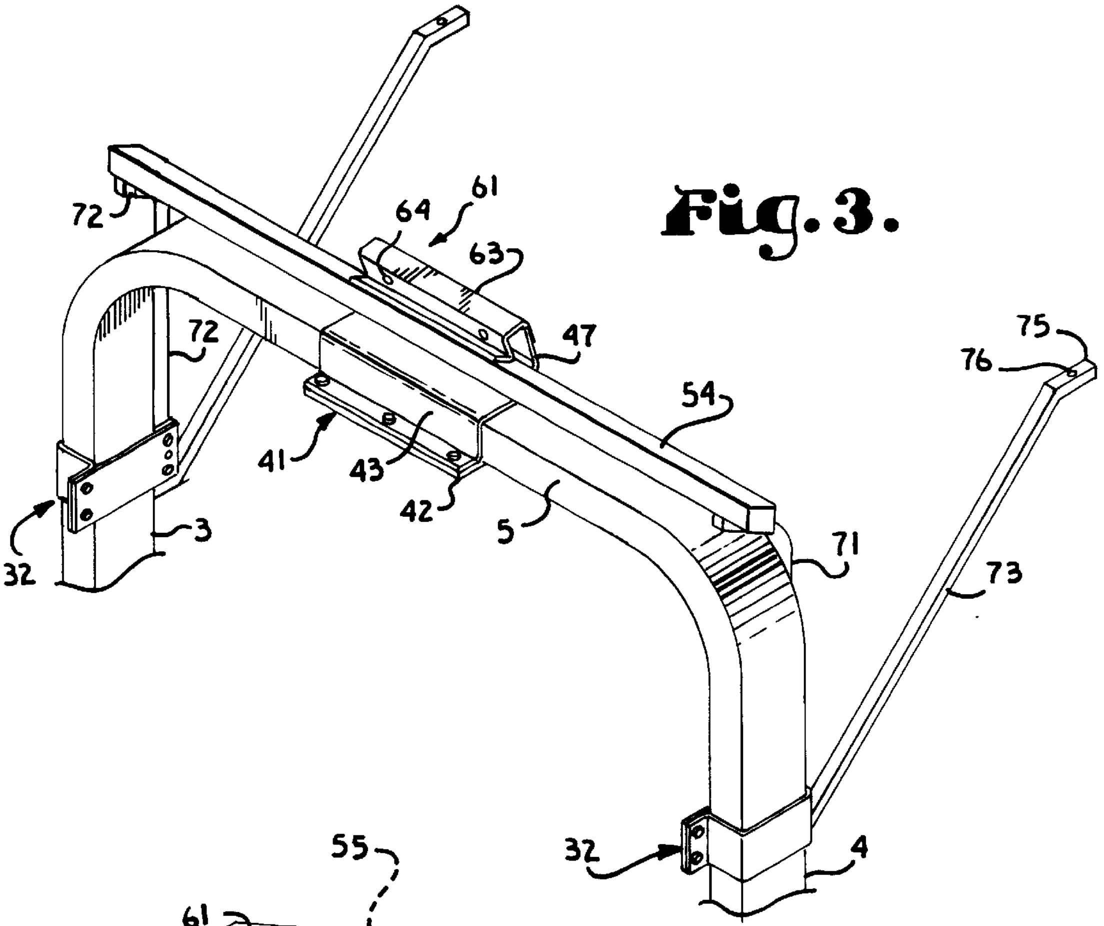
FIG. 3 is a greatly enlarged, fragmentary, perspective view of an upper portion of a tractor roll bar, with the inventive canopy attachment system mounted thereon, but with the canopy removed for ease of illustration.
Figure 4:
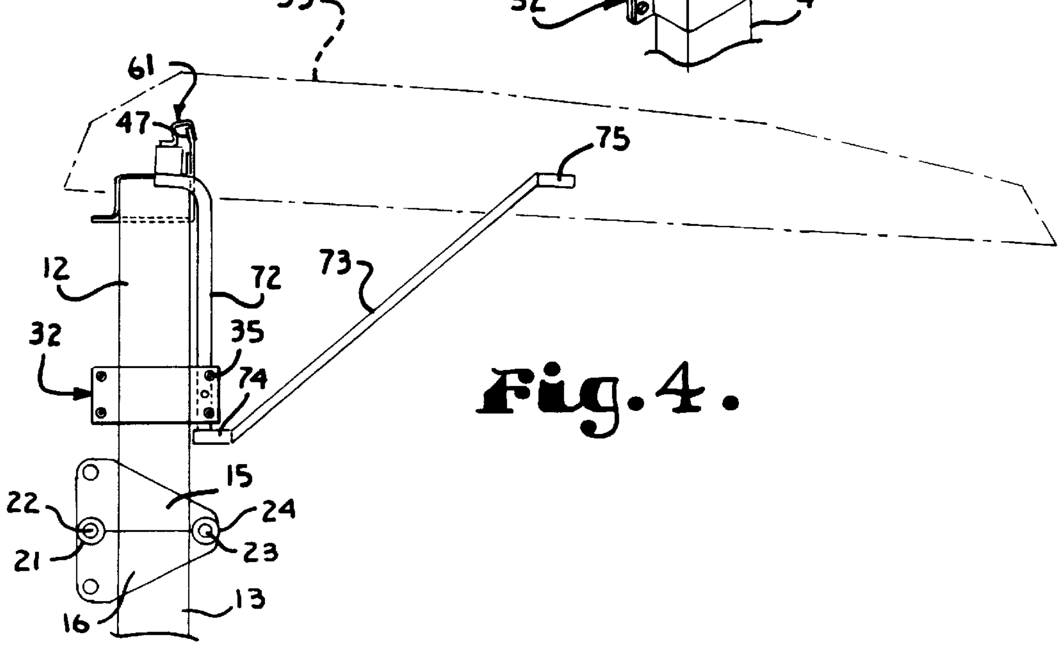
FIG. 4 is a fragmentary, side elevational view of an upper portion of the roll bar of FIG. 3, with the inventive canopy attachment system mounted thereon, and with the canopy shown in phantom lines.

Referring to FIG. 1, an agricultural tractor, generally indicated at 1, includes a roll bar, generally indicated at 2. The roll bar 2 includes left and right upright supports 3 and 4, respectively, with a horizontal bar 5 (FIG. 3) extending therebetween and generally positioned above an operators position 11. Referring to FIGS. 1 and 4, each upright support 3 and 4 comprises an upper section 12 and a lower section 13, which are attached to each other via a locking hinge 14. Each locking hinge 14 includes upper and lower, generally triangularly shaped hinge plate pairs 15 and 16, respectively, which are hingedly attached to each other via sleeves 21 on a common axis and a pivot pin 22 extending through the sleeves 21. Each upper plate pair 15 is attached to a respective upper support section 12 and each lower plate pair 16 is attached to a respective lower support section 13 such that the hinge 14 allows the upper support sections 12 to be pivoted backward and folded down to allow the roll bar 2 to be folded approximately in half. When the roll bar 2 is pivoted back to its upper protective position, a locking bolt or pin 23 is inserted through sleeves 24 in the plate pairs 15 and 16 to lock the roll bar 2 in the upper position.

It should be noted that the illustrated hinged roll bar is conventional, and is merely representative of a number of different hinged roll bars. The present invention is usable with any tractor roll bar configuration, whether hinged or not.

Referring to FIGS. 1–4, the canopy attachment system is generally indicated at 31. The system 31 includes a pair of vertical mounting brackets 32, each of which includes a plate 33 and a generally U shaped member 34. Each bracket 32 is attachable on a respective upright support 3 or 4 of the roll bar 2 by placing the U shaped member 34 around the upright support 3 or 4 from the outside thereof. The plate 33 is then bolted to the U shaped member 34 via bolts 35 extending through aligned apertures 36 to thereby clamp each vertical mounting bracket 32 in position on the respective support 3 or 4.

The system 31 also includes a horizontal mounting bracket 41, which includes a first generally L shaped angle member 42 which is sized and shaped to abut and overlap both a front surface and a bottom surface of the horizontal bar 5 of the roll bar 2. The bracket 41 also includes a second, generally L shaped angle member 43 which is sized and shaped to abut and overlap both a rear surface and a top surface of the horizontal bar 5 of the roll bar 2. The member 43 also includes a flange 44 which extends upward and a flange 45 which extends rearward, with the flanges 44 and 45 being attachable to respective legs of the first angle member 43 via a plurality of bolts 46 extending through aligned apertures 47 to thereby clamp the bracket 41 about the roll bar horizontal bar 5, as shown in FIG. 3. The first angle member 42 also includes an extension which extends upward past the second angle member 43 and rearward at a slight angle from vertical to form a mounting flange 48. The mounting flange 48 includes a pair of through bores 51, whose purpose will be explained below.

The mounting system 31 includes a canopy attachment frame, generally indicated at 53, which frame 53 includes a cross member 54, which may be made of steel tubing with a square cross section, for example. The cross member 54 is attachable to a bottom surface of a canopy 55 near the rear thereof via mounting apertures 56 such that the cross member 54 is positioned beneath the canopy 55. A mounting flange 61 is attached to the cross member 54 near the center thereof. The mounting flange 61 includes a generally flat leg 62 which is attached to the cross member 54, and a series of additional legs forming an inverted U shaped mounting flange receiver 63. The receiver 63 is sized and positioned at an angle such that it receives the angled extension 48 of the horizontal mounting bracket 41 when the cross member 54 is rested on the horizontal bar 5 of the roll bar 2, as is shown in FIGS. 3 and 4. The cooperation of the mounting flange receiver 63 and the angled mounting flange 48 thus serve to hold the cross member 54 in place on the roll bar horizontal bar 5 during installation, as explained below. The receiver 63 also includes a pair of apertures 64 which are sized and positioned to match and correspond with the apertures 51 in the angled mounting flange 48.

The mounting system canopy attachment frame 53 also includes a pair of angled braces 65 and 66, each of which includes a substantially vertical support arm 71 with an angled attachment leg 72. Each leg 72 is attached to a bottom side of the cross member 54 near a respective end thereof by welding or other suitable attachment techniques. Each angled brace 65 and 66 also includes an angled support arm 73 which includes a lower leg 74 which is attached to a lower end of the vertical support arm 71 and an upper leg 75 which is provided with a mounting aperture 76 for attachment to the canopy 55, as is generally indicated in FIG. 4. Each of the vertical support arms 71 includes a mounting aperture 81 extending side to side therethrough, which apertures 81 are positioned to align with corresponding apertures 82 on each of the vertical mounting brackets 32. While the angled braces 65 and 66 have been shown as constructed of interconnected arms 71 and 73, they can also be of a unitary construction with the same general shape.

In operation, the canopy attachment frame 53 is first attached to the canopy 55 by bolting or otherwise attaching the angled support arms 65 and 66 and the cross member 54 to the underneath side of the canopy 55. The canopy 55 is conventional and can be made of laminated fiberglass or lighter weight molded plastic materials, for example. The horizontal support bracket 41 and the pair of vertical support brackets 32 are then clamped to the roll bar 2, as described above.

An operator then lifts the canopy 55, with the attachment frame 53 attached, into position over the roll bar 2 such that the U shaped receiver 63 is placed over the angled mounting flange 48. The weight of the canopy 55 is thus temporarily held by resting the attachment frame cross member 54 on the roll bar horizontal bar 5 and the vertical support arms 71 on the vertical brackets 32, with the cooperation of the receiver 63 and the mounting flange 48 holding it in place thereon. The operator can then adjust the canopy side to side to align the through bores 64 on the receiver 63 with the apertures 51 on the mounting flange 48 and insert a top pair of pins 83 therethrough. When the pins 83 are inserted through the receiver 63, this has the effect of aligning the apertures 81 in each vertical support arm 71 with the corresponding apertures in the vertical support brackets 32. The operator can then insert a lower pair of the pins 83 through these aligned apertures 81 and 82. The canopy 55 is thus securely held in place on the roll bar 2 by the attachment system 31.

Removal of the canopy 55 is easily and quickly accomplished by reversing the above procedure. First the pins 83 are removed from the apertures 81 and 82 and then from the through bores 64 and the apertures 51. The canopy 55 can then be simply lifted up and off of the roll bar 2. The vertical support brackets 32 and the horizontal support bracket 41 are simply left in place on the roll bar 2 pending the next installation of the canopy 55.

It should be noted that many variations can be made to the inventive canopy attachment system 31 without departing from the character and scope of the invention. For example, the mounting flange 48 can be changed to a U shaped configuration to provide a more secure and stronger grip on the U shaped receiver 63. Instead of the illustrated cylindrical pins 83, cotter pins, threaded bolts or other removable securing members can be used as well. The particular angles and lengths of the components of the attachment system 31 are merely illustrative, and are readily adaptable to different roll bar configurations. For example, the cross member 54 of the attachment frame 53 can include slots or multiple apertures extending vertically therethrough which allow the vertical support arms 71 to be adjusted along the length of the cross member 54 to adapt to different sizes and widths of tractor roll bars.

It is thus to be understood that while certain forms of the present invention have been illustrated and described herein, it is not to be limited to the specific forms or arrangement of parts described and shown.

What is claimed and desired to be secured by Letters Patent is as follows:

1. A canopy attachment system for attaching a canopy to a roll bar, the roll bar including a pair of upright supports and a horizontal bar, said system including:

a. a horizontal mounting bracket extending linearly along and attachable to the roll bar horizontal support such that it extends linearly along at least a portion of the horizontal support; and b. an attachment frame attachable to the canopy, said attachment frame comprising:

i. a cross member; and ii. an attachment member connected to said cross member, said attachment member being sized and positioned to releasably engage said horizontal mounting bracket linearly along said horizontal mounting bracket to thereby hold said attachment frame in place on the roll bar.

2. A canopy attachment system as in claim 1, wherein:

a. said horizontal mounting bracket includes an upwardly extending mounting flange which extends linearly along at least said portion of the roll bar horizontal support; and b. said attachment frame attachment member includes a mounting flange receiver sized and positioned to receive said mounting flange when said attachment frame is placed on said roll bar.

3. A canopy attachment system as in claim 2, and further comprising:

a. at least one aperture extending through said mounting flange and a through bore extending through said mounting flange receiver, said aperture in said mounting flange and through bore in said mounting flange receiver being aligned when said attachment frame is placed on said roll bar; and b. removable securing means extending through the aligned aperture and through bore to secure said attachment frame to said horizontal mounting bracket.

4. A canopy attachment system as in claim 3, wherein said removable securing means comprise a pin.

5. A canopy attachment system as in claim 1, and further comprising:

a. at least one vertical mounting bracket attachable to a respective one of the roll bar upright supports; and b. said attachment frame further comprises at least one vertical support arm attached to and extending downward from said cross member, said vertical support arm being sized and positioned to releasably engage a portion of said horizontal mounting bracket to thereby hold said attachment frame in place on said roll bar.

6. A canopy attachment system as in claim 5, said attachment frame further comprising:

a. at least one angled support arm with a first end attached to and extending upward and forward from said vertical support arm and a second end attached to the canopy.

7. A canopy attachment system as in claim 6, wherein:

a. there are a pair of said vertical mounting brackets with each one attachable to a respective one of the roll bar upright supports; and b. said attachment frame comprises two of said vertical support arms attached to and extending downward from said cross member, each said vertical support arm being sized and positioned to releasably engage a portion of said horizontal mounting bracket to thereby hold said attachment frame in place on said roll bar.

8. A canopy attachment system as in claim 7, and further comprising:

a. apertures extending through corresponding ones of each of said vertical mounting brackets and each of said vertical support arms, said apertures in said vertical mounting brackets and said vertical support arms being aligned when said attachment frame is placed on said roll bar; and b. removable securing means extending through the aligned apertures to secure said vertical support arms to said vertical mounting brackets.

9. A canopy attachment system as in claim 8, wherein said removable securing means comprise a pin.

10. A canopy attachment system for attaching a canopy to a roll bar, the roll bar including a pair of upright supports and a horizontal bar, said system including:

a. at least one vertical mounting bracket attachable to a respective one of the roll bar upright supports; and b. said attachment frame further comprises at least one vertical support arm attached to and extending downward from said horizontal bar, said vertical support arm being sized and positioned to releasably engage a portion of said vertical mounting bracket to thereby hold said attachment frame in place on said roll bar.

11. A canopy attachment system as in claim 10, and further comprising:

a. a horizontal mounting bracket attachable to the roll bar horizontal support; and b. an attachment frame attachable to the canopy, said attachment frame comprising:

i. a cross member; and ii. an attachment member connected to said cross member, said attachment member being sized and positioned to releasably engage a portion of said horizontal mounting bracket to thereby hold said attachment frame in place on said roll bar.

12. A canopy attachment system as in claim 11, wherein:

a. said horizontal mounting bracket includes an upwardly extending mounting flange; and b. said attachment frame attachment member includes a mounting flange receiver sized and positioned to receive said mounting flange when said attachment frame is placed on said roll bar.

13. A canopy attachment system as in claim 12, and further comprising:

a. at least one aperture extending through said mounting flange and a through bore extending through said mounting flange receiver, said aperture in said mounting flange and through bore in said mounting flange receiver being aligned when said attachment frame is placed on said roll bar; and b. removable securing means extending through the aligned aperture and through bore to secure said attachment frame to said horizontal mounting bracket.

14. A canopy attachment system as in claim 13, wherein said removable securing means comprise a pin.

15. A canopy attachment system as in claim 10, said attachment frame further comprising:

a. at least one angled support arm with a first end attached to and extending upward and forward from said vertical support arm and a second end attached to the canopy.

16. A canopy attachment system as in claim 15, wherein:

a. there are a pair of said vertical mounting brackets with each one attachable to a respective one of the roll bar upright supports; and b. said attachment frame comprises two of said vertical support arms attached to and extending downward from said cross member, each said vertical support arm being sized and positioned to releasably engage a portion of said horizontal mounting bracket to thereby hold said attachment frame in place on said roll bar.

17. A canopy attachment system as in claim 16, and further comprising:

a. apertures extending through corresponding ones of each of said vertical mounting brackets and each of said vertical support arms, said apertures in said vertical mounting brackets and said vertical support arms being aligned when said attachment frame is placed on said roll bar; and b. removable securing means extending through the aligned apertures to secure said vertical support arms to said vertical mounting brackets.

18. A canopy attachment system as in claim 17, wherein said removable securing means comprise a pin.

19. A canopy attachment system for attaching a canopy to a roll bar, the roll bar including a pair of upright supports and a horizontal bar, said system including:

a. a horizontal mounting bracket attachable to the roll bar horizontal support;

b. a pair of vertical mounting brackets attachable to respective ones of the roll bar upright supports; and c. an attachment frame attachable to the canopy, said attachment frame comprising:

i. a cross member;

ii. an attachment receiver connected to said cross member, said attachment receiver being sized and positioned to releasably receive a portion of said horizontal mounting bracket to thereby hold said attachment frame in place on said roll bar;

iii. a pair of vertical support arms attached to and extending downward from said cross member, each said vertical support arm being sized and positioned to releasably engage a portion of a corresponding one of said horizontal mounting brackets to thereby hold said attachment frame in place on said roll bar; and iv. a pair of angled support arms, each said angled support arm including a first end attached to and extending upward and forward from a respective one of said vertical support arms and a second end attached to the canopy.

20. A canopy attachment system as in claim 19, wherein:

a. said horizontal mounting bracket includes an upwardly extending mounting flange;

b. said attachment frame attachment member includes a mounting flange receiver sized and positioned to receive said mounting flange when said attachment frame is placed on said roll bar;

c. at least one aperture extending through said mounting flange and a through bore extending through said mounting flange receiver, said aperture in said mounting flange and through bore in said mounting flange receiver being aligned when said attachment frame is placed on said roll bar; and d. removable securing means extending through the aligned aperture and through bore to secure said attachment frame to said horizontal mounting bracket.

21. A canopy attachment system as in claim 17, and further comprising:

a. apertures extending through corresponding ones of each of said vertical mounting brackets and each of said vertical support arms, said apertures in said vertical mounting brackets and said vertical support arms being aligned when said attachment frame is placed on said roll bar; and b. removable securing means extending through the aligned apertures to secure said vertical support arms to said vertical mounting brackets.

22. A canopy attachment system for attaching a canopy to a roll bar, the roll bar including a pair of upright supports and a horizontal bar, said system including:

a. a horizontal mounting bracket attachable to the roll bar horizontal support, said horizontal mounting bracket including an upwardly extending mounting flange;

b. an attachment frame attachable to the canopy, said attachment frame comprising:

i. a cross member; and ii. an attachment member connected to said cross member, said attachment member being sized and positioned to releasably engage a portion of said horizontal mounting bracket to thereby hold said attachment frame in place on said roll bar and including a mounting flange receiver sized and positioned to receive said mounting flange when said attachment frame is placed on said roll bar;

c. at least one aperture extending through said mounting flange and a through bore extending through said mounting flange receiver, said aperture in said mounting flange and through bore in said mounting flange receiver being aligned when said attachment frame is placed on said roll bar; and d. removable securing means extending through the aligned aperture and through bore to secure said attachment frame to said horizontal mounting bracket.

* * * * *